United States Patent [19]

Ostrowski et al.

[11] 4,433,210
[45] Feb. 21, 1984

[54] INTEGRATED CIRCUIT PHONEME-BASED SPEECH SYNTHESIZER

[75] Inventors: Carl L. Ostrowski, Mt. Clemens, Mich.; Bertram White, Tustin, Calif.

[73] Assignee: Federal Screw Works, Detroit, Mich.

[21] Appl. No.: 369,356

[22] Filed: Apr. 19, 1982

Related U.S. Application Data

[63] Continuation of Ser. No. 156,483, Jun. 4, 1980, abandoned.

[51] Int. Cl.$^3$ .................................................. G10L 1/00
[52] U.S. Cl. ......................................................... 381/53
[58] Field of Search .............. 179/1 SM, 1 SG, 1 SA, 179/1 SF; 84/1.01; 328/14; 307/260, 271; 364/723, 724

[56] References Cited

U.S. PATENT DOCUMENTS

| | | |
|---|---|---|
| 3,836,717 | 9/1974 | Gagnon . |
| 3,908,085 | 9/1975 | Gagnon . |
| 4,031,369 | 6/1977 | Heaman et al. .................... 364/723 |
| 4,128,737 | 8/1976 | Dorais . |
| 4,130,730 | 9/1977 | Ostrowski . |

OTHER PUBLICATIONS

B. J. White and D. A. Hodges, "Electronics", Feb. 15, 1979.
David J. Allstot, Robert W. Brodersen and Paul R. Gray, "ISSCC Digest of Technical Papers", Feb. 14, 1979, vol. 22.
Robert W. Brodersen, Paul R. Gray, and David A. Hodges, "MOS Switched-Capacitor Filters", Jan. 1979, from *Proceedings of the IEEE*.
Ser. No. 952,792, filed Oct. 19, 1978, Richard T. Gagnon.

*Primary Examiner*—Emanuel S. Kemeny
*Attorney, Agent, or Firm*—Harness, Dickey & Pierce

[57] ABSTRACT

A phoneme-based speech synthesizer that is particularly adapted for implementation on a single integrated circuit chip. The vocal tract is comprised of a fixed resonant filter and a plurality of tunable resonant filters whose resonant frequencies are controlled in accordance with the values of certain control parameters. The vocal tract is implemented utilizing a capacitive switching technique which eliminates the need for large valued components to achieve the relatively low frequencies of human speech. In addition, a novel digital transition circuit is included which gradually transitions the values of the vocal tract control parameters as they change from phoneme to phoneme. A unique glottal source generator is also disclosed which is adapted to digitally generate a glottal pulse signal in a manner which readily permits the glottal pulse to be spectrally shaped in any desired configuration.

12 Claims, 15 Drawing Figures

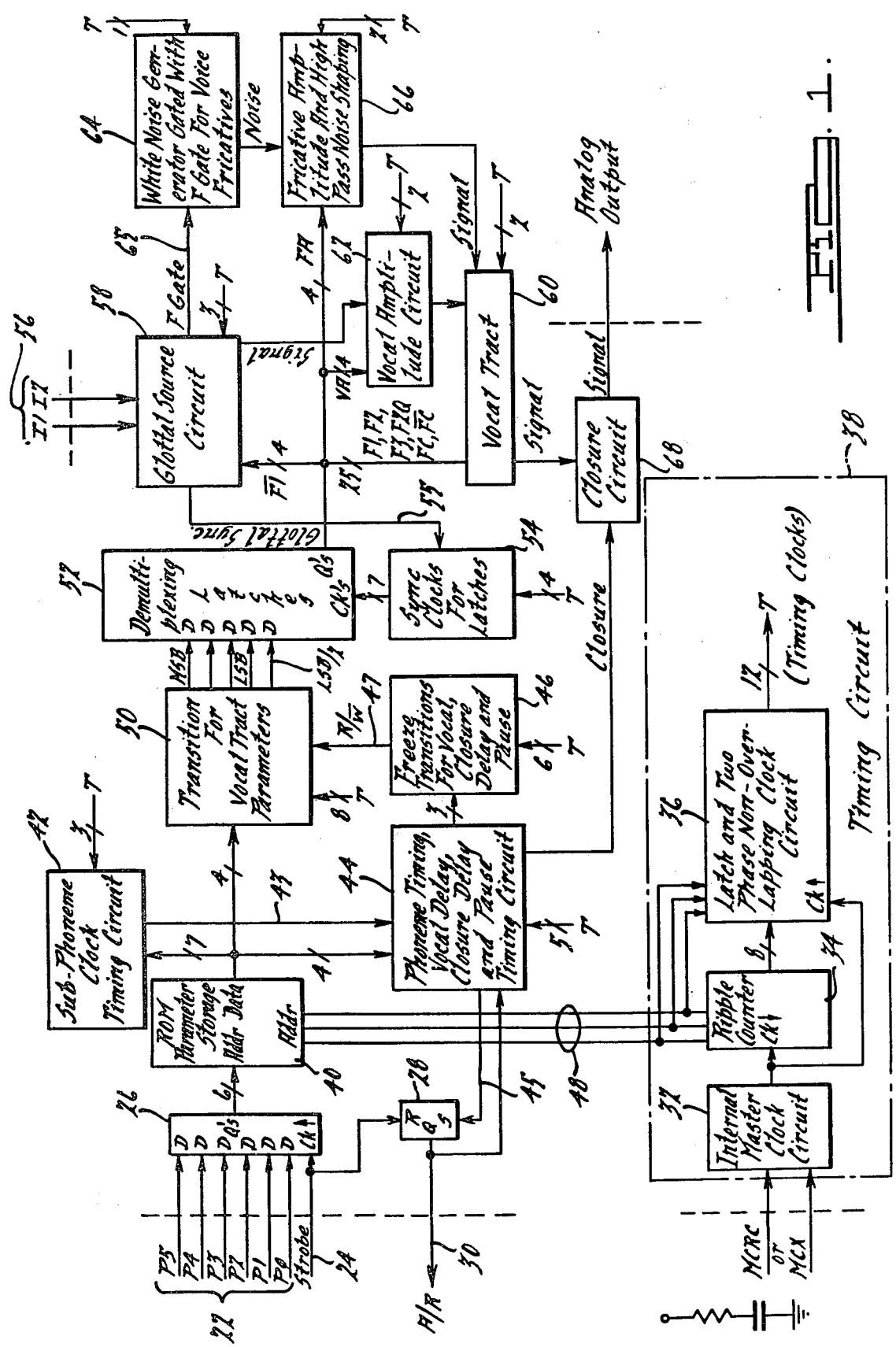

Timing Circuit

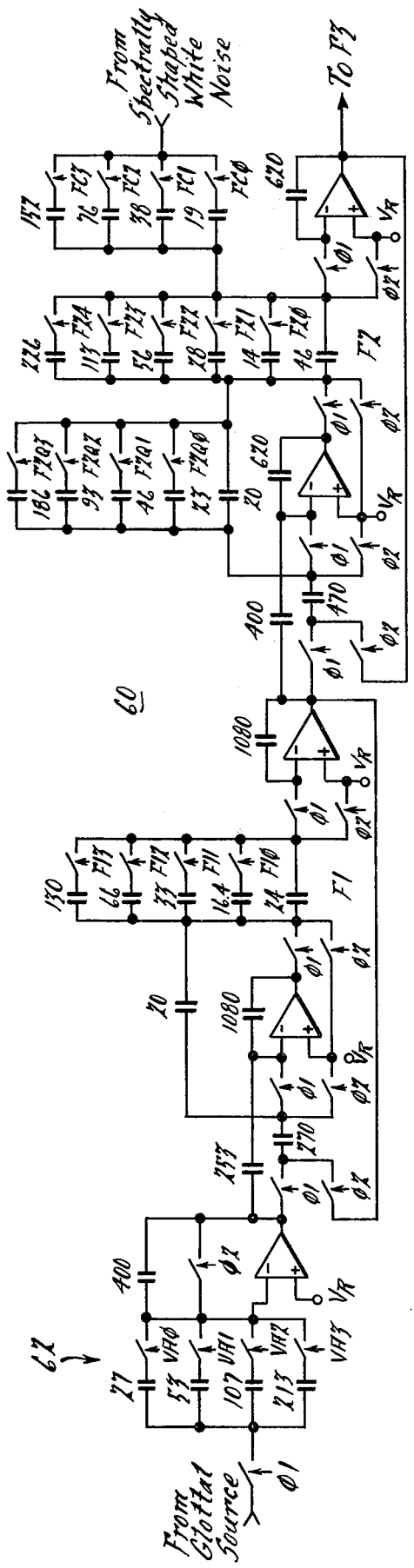
Fig. 8
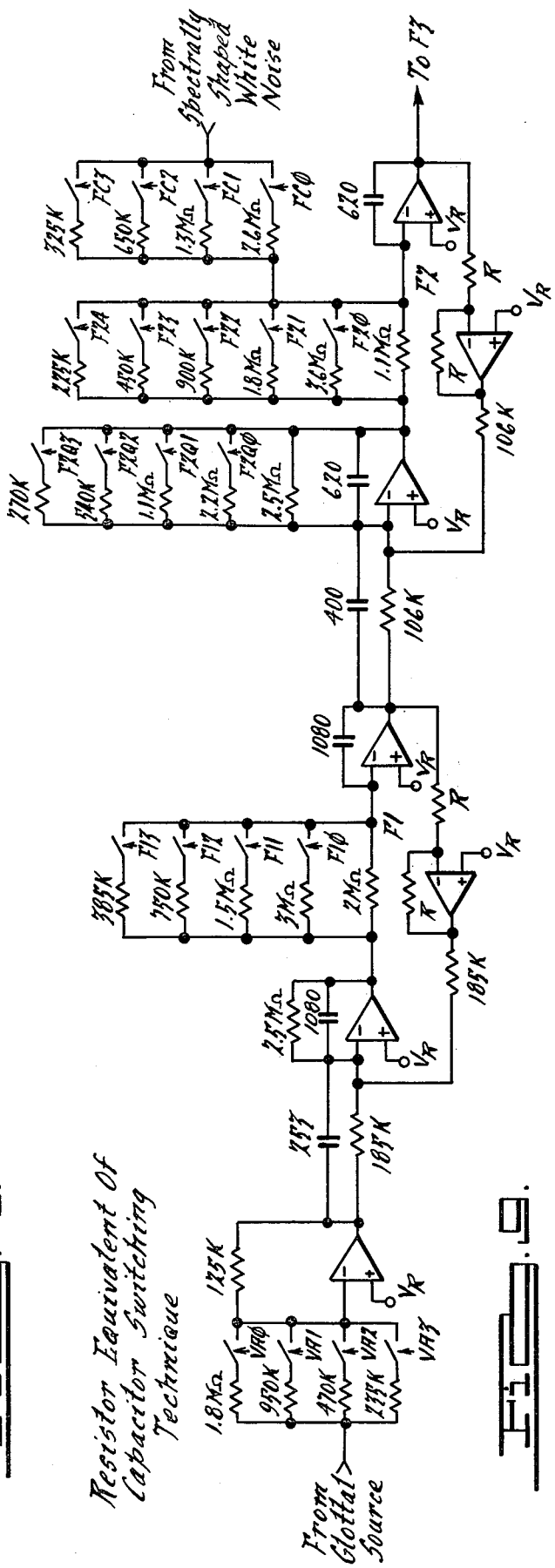
Fig. 9

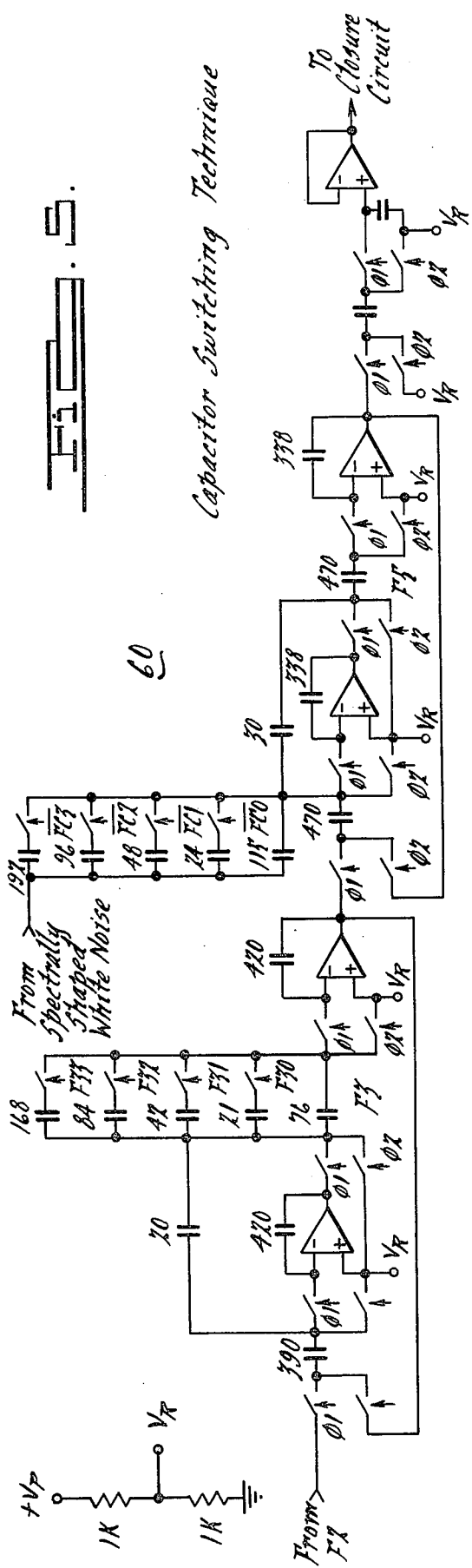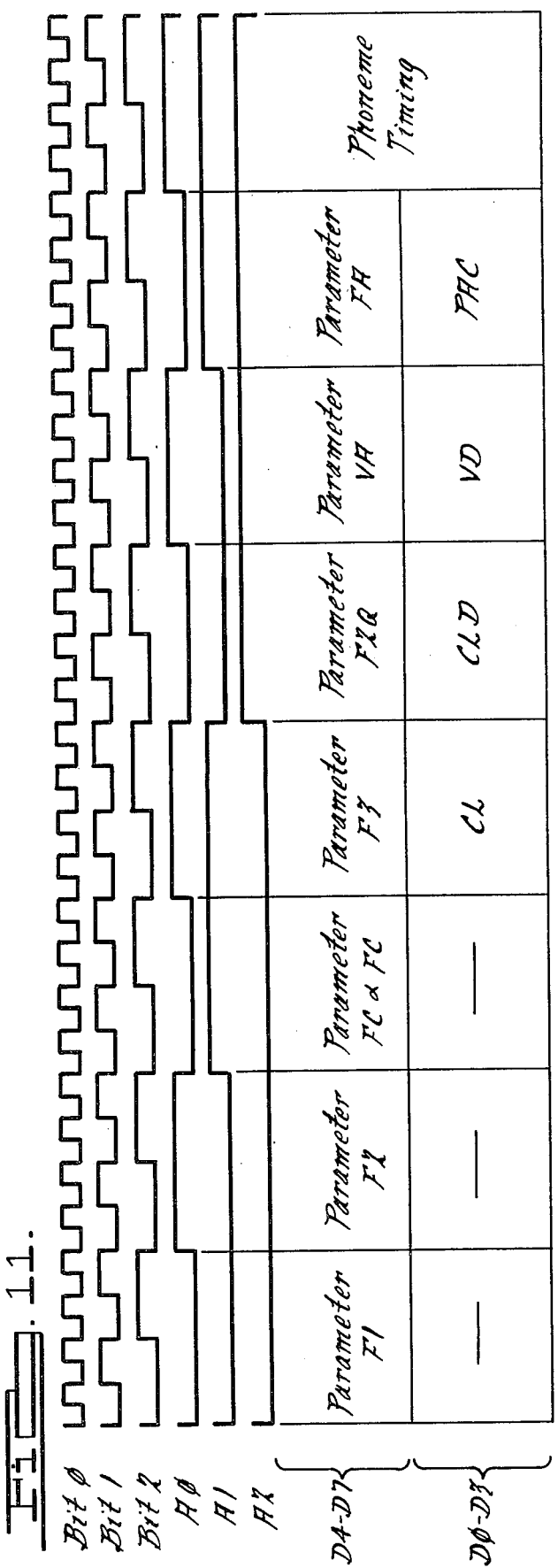

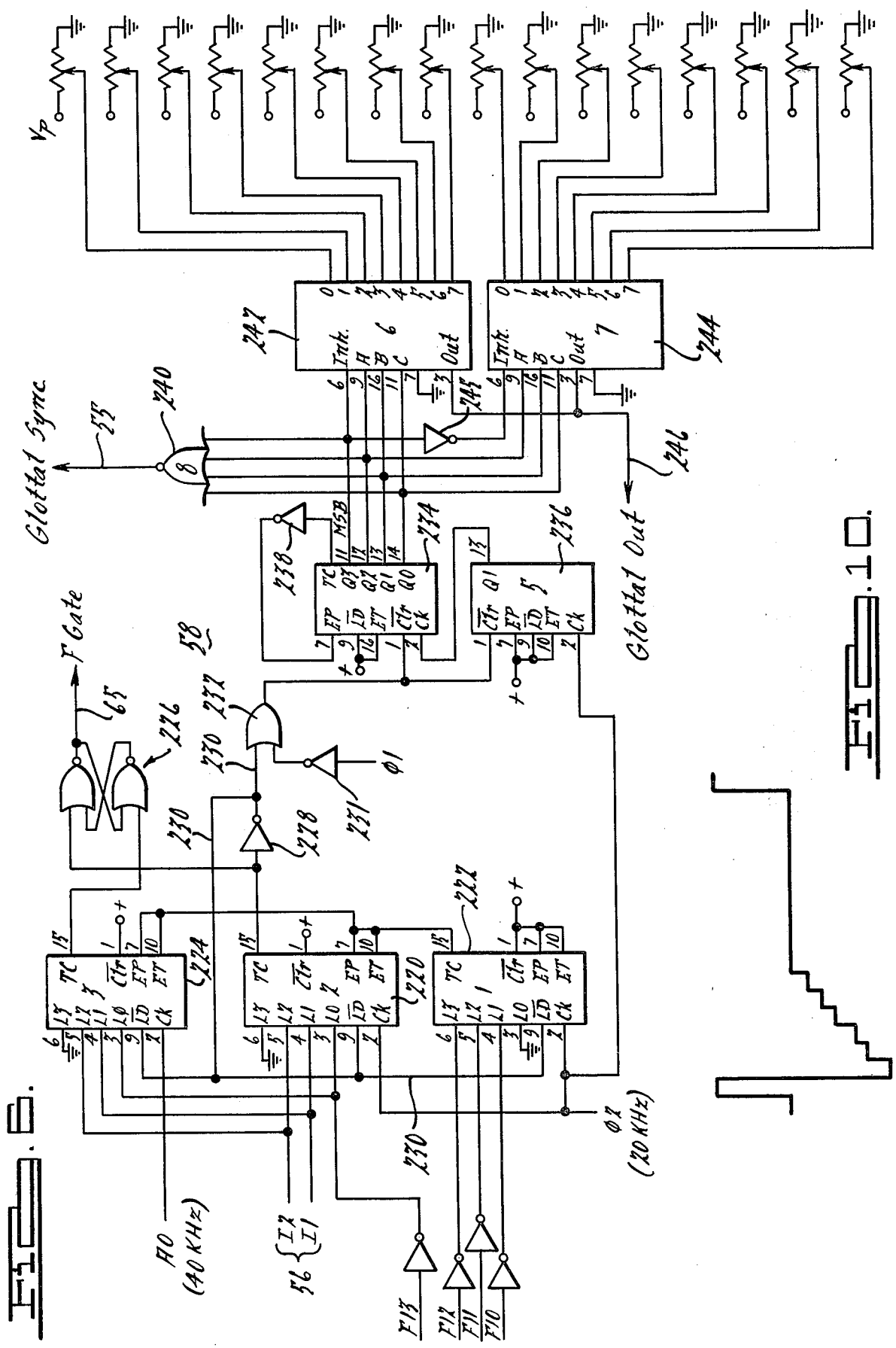

INTEGRATED CIRCUIT PHONEME-BASED SPEECH SYNTHESIZER

This is a continuation of application Ser. No. 156,483, filed June 4, 1980 now abandoned.

BACKGROUND AND SUMMARY OF THE INVENTION

The present invention relates to speech synthesis and in particular to a phoneme-based speech synthesizer that is particularly adapted for implementation in a single encapsulated integrated circuit.

Known phoneme-based speech synthesizers have principally contained vocal tracts comprised of a plurality of resonant filters. It has heretofore generally been considered impractical to produce vocal tracts of this type in integrated circuit form for several significant reasons. First of all, tunable resonant filters of the type commonly used in vocal tracts require resistors and capacitors having relatively large values to produce resonant frequencies in the relatively low frequency range of the human voice. Large value components substantially increase the size of an integrated circuit. Secondly, vocal tract resonant filters are high precision filters which are difficult to produce in integrated circuit form within the required tolerance limits.

The present invention utilizes a novel capacitive switching technique to implement the vocal tract, as well as additional parameter controlled functions, which eliminates the above noted problems and thus makes the speech synthesizer according to the present invention particularly adapted for implementation as a single integrated circuit silicon "chip". The capacitive switching technique employed not only eliminates the requirement of large valued components in the vocal tract, but also eliminates the requirement that the values, and hence the size, of the tuning components in the vocal tract be accurately controlled. Rather, as will subsequently be seen, with the capacitive switching technique of the present invention, it is only important that the ratio of the tuning component values be accurately controlled, thus making it substantially easier to maintain the high accuracy levels required during production.

In addition, the present speech synthesizer includes a unique digital transition circuit which gradually transitions the values of certain control signal parameters between the different steady-state values assigned for different phonemes. In this manner, adjacent phonetic sounds are properly integrated to produce natural sounding speech.

The speech synthesizer of the present invention also includes a novel glottal source circuit which digitally generates the glottal pulse signal in a manner which readily permits the waveform of the glottal pulse signal to be spectrally shaped in any manner desired.

In general, the present speech synthesizer system as disclosed herein comprises a single encapsulated silicon chip which phonetically synthesizes continuous speech of unlimited vocabulary from low data input rates. The system includes a parameter storage ROM containing parameter values defining 64 different phonemes which are accessed by a 6-bit command word. Two additional input bits are provided for varying the pitch or inflection of voiced phonemes. The control parameters are generated by the storage ROM in a multiplexed fashion on an 8-bit parallel output buss. The control parameters which are used to control the vocal tract are initially provided to a novel digital transition circuit which serves to gradually transition the variations in the steady-state values of the parameters which occur from phoneme to phoneme. As will subsequently be seen, the digital transition circuit performs this function in a unique manner by continuously adding one eighth of the difference between the target parameter value and the current parameter value to the current parameter value, and using the result as the new current parameter value. In the preferred embodiment, the transition circuit is clocked at a rate which results in a parameter attaining approximately 70% of its target value within a span of 33 milliseconds.

The transitioned control signal parameters from the digital transition circuit are provided to the vocal tract to control the resonant frequencies of the F1, F2 and F3 resonant filters, and to control the injection of vocal and fricative excitation energy into the vocal tract. In addition, the "Q" or bandwidth of the F2 resonant filter is separately controllable for producing nasal phonemes as is conventional. The various parameter controlled functions are implemented by utilizing the 4-bit parallel digital parameter signals to selectively control the capacitance ratio of capacitor networks in the controlled circuits. The capacitor networks are then switched on and off at a predetermined frequency so that the controlled capacitor networks effectively simulate a controlled variable resistance element.

The glottal source generator circuit produces a glottal pulse signal having a fundamental frequency that varies in accordance with the setting of the two inflection control bits. In addition, a degree of automatic inflection control is provided by also varying the fundamental frequency of the glottal signal inversely with respect to movement in the resonant frequency of the F1 resonant filter in the vocal tract. The spectral shape of the glottal pulse is controlled by selectively presetting the analog d.c. signal levels applied to the parallel inputs of a multiplexer. The selector inputs of the multiplexer are connected to the output of a counter which is clocked at a predetermined rate. The waveform of the glottal signal produced at the serial output of the multiplexer therefore comprises a segmented approximation of an analog glottal pulse signal with the levels of the various segments determined by the preset d.c. levels.

Additional features and advantages of the present invention will become apparent from a reading of the detailed description of the preferred embodiment which makes reference to the following set of drawings in which:

BRIEF DESCRIPTION OF THE DRAWINGS

FIG. 1 is an overall block diagram of the speech synthesizer system of the present invention;

FIGS. 2a, 2b, 3a, 3b, 4–8 comprise a circuit diagram of the speech synthesizer system of FIG. 1;

FIG. 9 comprises a resistor equivalent of the portion of the vocal tract circuit illustrated in FIG. 4;

FIG. 10 is a sample waveform of a glottal pulse signal;

FIG. 11 is a timing diagram illustrating the timing relationship between various clock signals and also illustrating the multiplexing arrangement in which the control parameters are generated by the parameter storage ROM;

DETAILED DESCRIPTION OF THE PREFERRED EMBODIMENT

Figure 2A:
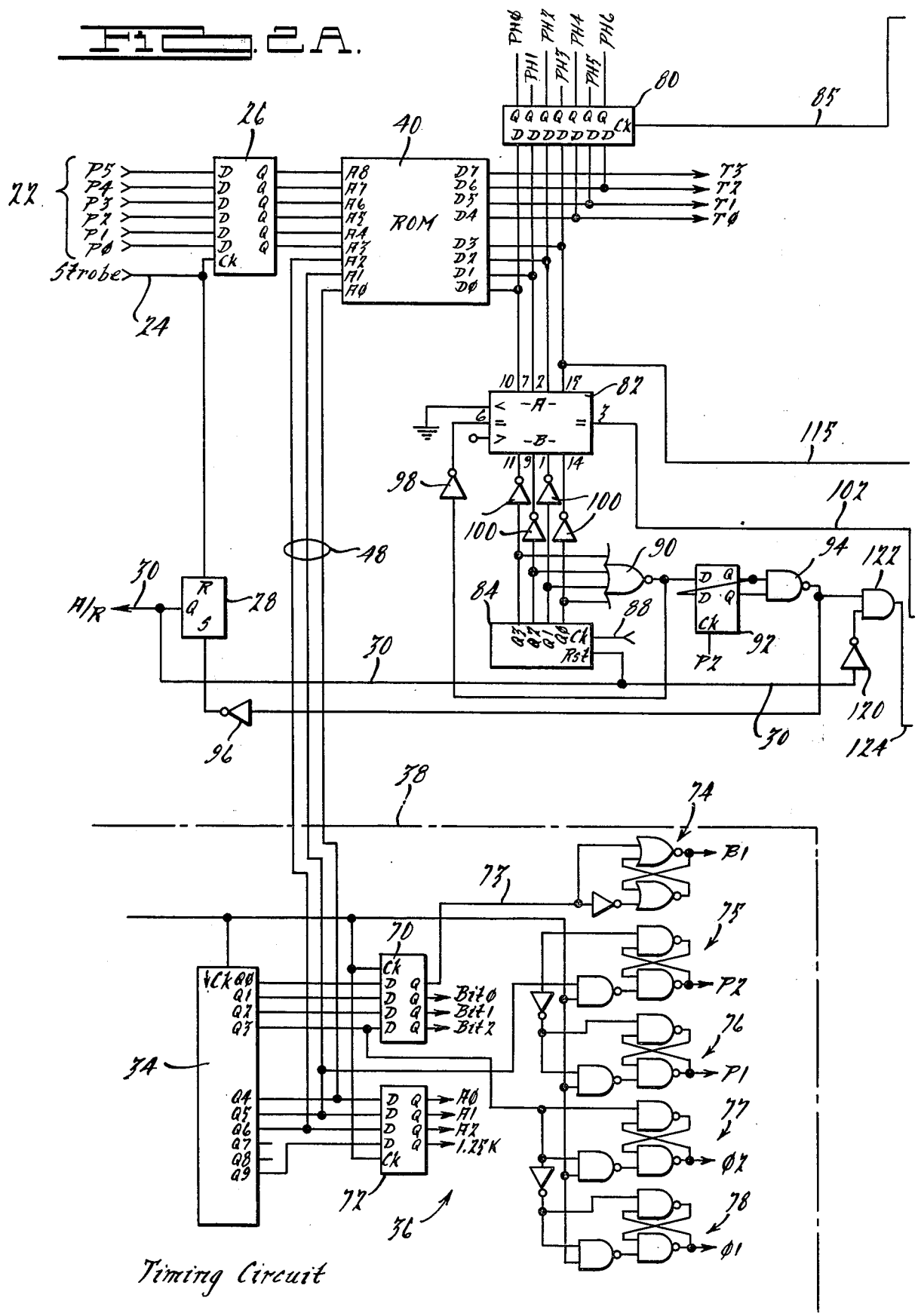

Referring to FIG. 1, an overall block diagram of a phoneme-based speech synthesizer 20 according to the present invention is shown. The illustrated system is adapted to be driven by an 8-bit digital input command word. Six of the input bits 22 from the digital command word are used for phoneme selection and the remaining two bits 56 for varying the inflection level or pitch of the audio output. The six phoneme select bits 22 are latched by a strobe signal on strobe line 24 into a six bit latch 26 whose six parallel outputs are provided to the six high order address inputs of a parameter storage ROM 40. The strobe signal on line 24 also resets an output latch 28 which forces the acknowledge/request (A/R) output line 30 LO to acknowledge receipt of the new data. The L0 signal on A/R line 30 is also provided to the phoneme timing, delay and pause timing network 44 to initialize the phoneme timing counter, as will subsequently be described in greater detail.

The parameter storage ROM 40 contains data defining 64 different phonemes which are accessed by the six phoneme select bits 22. For each of the 64 different phonemes, the parameter storage ROM 40 contains 12 control signal parameters which electronically define the phoneme. Each control signal parameter stored in ROM 40 preferably comprises four bits of resolution, thus providing sixteen different values for each parameter, except for the phoneme timing control parameter which comprises seven bits of resolution and therefore has 128 possible values. The parameter storage ROM 40 is adapted to provide the appropriate set of control signal parameter values defining the particular phoneme identified by the phoneme select bits 22 on its eight data output lines in a multiplexed fashion, such that two 4-bit control parameters are present on the eight data output lines at any given point in time, except again for the phoneme timing control parameter, which uses seven of the eight data outputs.

The parameter storage ROM 40 is additionally accessed by three parameter select bits 48 which are provided from the output of the timing circuit 38 to the three low order address inputs of storage ROM 40. The timing circuit 38 comprises an internal master clock circuit 32 which is adapted to produce a master clock signal having a frequency that is determined in accordance with the values of an external RC network connected to input terminal MCRC. Alternatively, the MCRC input terminal may be grounded and an external clock signal provided directly to the additional clock input terminal MCX. The master clock signal from the output of the master clock circuit 32 is provided to a ripple counter 34 which is adapted to produce eight clock signal outputs at varying predetermined frequencies. Three of the clock signals comprise the parameter selector bits which are provided on line 48 to the low order address inputs of the parameter storage ROM 40. The outputs from the ripple counter 34 are then provided to a latch and two-phase non-overlapping clock circuit 36 which is adapted to develop the 12 timing signals which are utilized in all sections of the system.

To summarize, therefore, the six phoneme select bits 22 identify the particular phoneme desired and the three parameter select bits 48 determine which of the 12 control signal parameters defining the identified phoneme are present on the data outputs of the parameter storage ROM 40 at any given point in time during the phoneme period. Certain of the control signal parameters which are to be provided to the vocal tract require transitioning to smooth the abrupt variations which occur in the values of the control parameters from one phoneme to the next. Accordingly, the data output lines from the parameter storage ROM carrying these control signal parameters are provided to a digital transition circuit 50 which digitally implements the desired transition function. The data output lines from the parameter storage ROM carrying the remaining control signal parameters which relate to various timing functions and do not require transitioning are provided directly to the phoneme timing, vocal delay, closure delay and pause timing circuit 44. As will subsequently be described in greater detail, the phoneme timing circuit 44 includes a counter which is clocked at a frequency determined by the phoneme timing control parameter to control the duration of each phoneme. More particularly, the count rate of the counter is determined by the frequency of the clock signal on line 43 from the output of the sub-phoneme clock timing circuit 42, which essentially comprises an oscillator whose frequency is controlled by the phoneme timing control parameter. When the counter attains a predetermined count, an output signal is produced on line 45 which sets output latch 28, thereby forcing the A/R output line 30 HI to indicate that new phoneme data is required Timing circuit 44 also includes a vocal delay and closure delay network which essentially comprises a magnitude comparator which is adapted to compare the count output of the phoneme timing counter with the values of the vocal delay and closure delay control signal parameters when presented at the data outputs of the parameter storage ROM 40. When an equivalency condition is detected by the magnitude comparator, the delay period is terminated. The purpose of the vocal delay control signal parameter is to delay the transmission of the vocal amplitude control signal, and hence delay or retain the injection of vocal excitation energy into the vocal tract, for a predetermined period of time less than the duration of a single phoneme time interval, during certain fricative-to-vowel phonetic transitions wherein the amplitude of the fricative constituent is rapidly decaying at the same time the amplitude of the vocal constituent is rapidly increasing. The closure delay control signal serves a similar function and is adapted to delay the transmission of the fricative amplitude and closure control signals. Implementation of the delay function is performed whenever a vocal delay or closure delay control signal parameter is present, by effectively "freezing" the digital transition circuitry 50 during the period of transmission for the vocal amplitude and fricative amplitude control signal parameters, respectively, for a period specified by the value of the vocal delay and closure delay control parameters. As will also be described subsequently in greater detail, this function is performed by a freeze transition circuit 46 which effectively clamps the read/write (R/$\overline{W}$) line 47 to a storage RAM in the digital transition circuit 50.

The transitioned control signal parameters from the output of the digital transition circuit 50 are de-multiplexed by a latching circuit 52 in accordance with appropriate timing signals from the timing circuit 38 which are provided through a synchronize clock circuit 54 for controlling the clocking of the latches 52. In addition, the glottal source circuit 58 produces a glottal sync signal at the beginning of each glottal pulse period which is also provided to the synchronize clock circuit 54 on line 55 to latch the F1, F2, F2Q and F3 control signal parameters from the transition circuit 50.

The vocal excitation signal is digitally generated by a glottal source circuit 58 in accordance with the two inflection select bits 56 from the eight bit digital input command word, which control the fundamental frequency of the glottal signal. In addition, it will be noted that a degree of automatic inflection control is provided by also varying the fundamental frequency of the vocal excitation signal in accordance with the inverse of the F1 control signal parameter ($\overline{F1}$). The resulting vocal excitation signal is then provided to a vocal amplitude circuit 62 which modulates the amplitude of the vocal excitation signal in accordance with the vocal amplitude control signal parameter before injection of the vocal excitation signal into the vocal tract 60.

The fricative excitation signal is supplied by a white noise generator 64. During voiced fricatives (e.g., z, v) when fricative and vocal excitation energy are both present, the white noise generator 64 is gated on only during the latter or "rest" portion of the glottal pulse signal under the control of the FGATE signal on line 65 from the glottal source circuit 58. The resulting white noise signal from the output of the generator circuit 64 is provided to a fricative amplitude and high-pass noise shaping network 66 which is adapted to filter the fricative excitation signal and modulate its amplitude in accordance with the fricative amplitude control signal parameter before injection into the vocal tract 60 under the control of the fricative control parameter (FC) and the inverse of the fricative control parameter ($\overline{FC}$).

The vocal tract 60 in the preferred embodiment comprises four serially connected resonant filters designated F1, F2, F3 and F5. The resonant frequencies of the F1-F3 resonant filters are controllable in accordance with the F1, F2 and F3 control signal parameters. The bandwidth or "Q" of the second order resonant filter (F2) in the vocal tract 60 is also controlled by the F2Q control signal parameter. Finally the output from the vocal tract 60 is provided to the closure circuit 68 which is adapted to abruptly modulate the amplitude of the audio output signal in accordance with the closure control signal (CL).

Figure 2B:
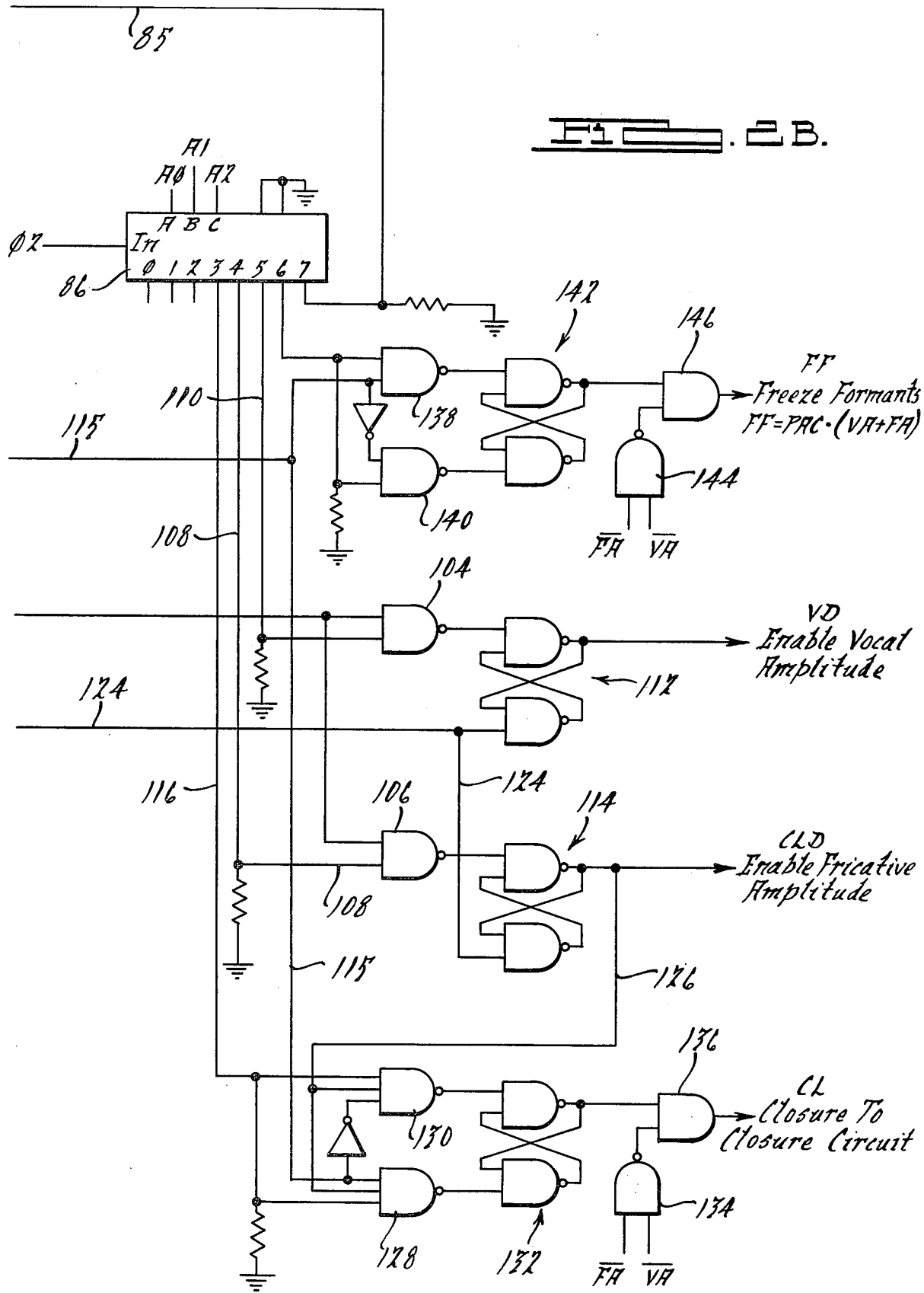

Referring now to FIGS. 2-8, and in particular to FIG. 2, a circuit diagram of the speech synthesizer 20 according to the present invention is shown. As previously noted in connection with the description of the block diagram in FIG. 1, the present speech synthesizer 20 is adapted to be driven by an 8-bit digital input command word. The six phoneme select bits 22 (P0-P5) are provided in parallel to the data (D) inputs of a 6-bit latch 26. The data present on phoneme select lines (P0-P5) is clocked into latch 26 by a strobe signal produced on line 24 which also serves to reset output latch 28, thereby forcing the acknowledge/request line 30 LO to acknowledge receipt of the new phoneme data. The LO output signal on A/R line 30 also serves to reset the phoneme timing counter 84, the purpose of which will be subsequently described. The Q outputs from latch 26 are provided to the high order address inputs (A3-A8) of the parameter storage ROM 40. The remaining three low order address inputs (A0-A2) of ROM 40 are connected to the parameter select bits 48 from the output of the timing circuit 38. As previously noted, the control signal parameters defining the phoneme identified by phoneme select bits 22 are produced at the data outputs (D0-D7) of parameter storage ROM 40 in a multiplexed fashion in accordance with the three parameter select bits 48.

Although known in the art the functions of the various control signal parameters generated by parameter storage ROM 40 will be briefly summarized to provide a better understanding of the operation of the present system.

The F1, F2, and F3 control parameters determine the locations of the resonant frequency poles in the first three variable resonant filters in the vocal tract. The fricative control parameter (FC) replaces two control parameters normally provided in synthesizers of this type; i.e., the fricative frequency and fricative low pass control parameters. Specifically, it has been determined that, in general, when a fricative phoneme requires low frequency fricative energy in the range of the F2 formant, it does not also require a substantial amount of high frequency fricative energy in the range of the F5 formant, and vice versa. Thus, the present invention utilizes a single fricative control (FC) parameter, and the inverse of the FC control parameter ($\overline{FC}$), to control the parallel injection of both low and high frequency fricative energy into the vocal tract. The F2Q control parameter varies the "Q" or bandwidth of the second order resonant filter (F2) in the vocal tract and is used primarily in connection with the production of the nasal phonemes "n", "m" and "ng". Nasal phonemes typically exhibit a higher amount of energy at the first formant (F1) and substantially lower and broader energy content at the higher formants. Thus, during the presence of nasal phonemes, the F2Q control parameter is generated to reduce the Q or increase the bandwidth of the F2 resonant filter which, due to the cascaded arrangement of the resonant filters in the vocal tract, prevents significant amounts of energy from reaching the higher formants. The vocal amplitude control parameter (VA) is generated whenever a phoneme having a voiced component is present. The vocal amplitude control parameter controls the intensity of the voiced component in the audio output. The fricative amplitude control parameter (FA) is generated whenever a phoneme having an unvoiced component is present and is used to control the intensity of the unvoiced component in the audio output. The closure parameter (CL) is used to simulate the phoneme interaction which occurs, for example, during the production of the phoneme "b" followed by the phoneme "e". In particular, the closure control parameter, when provided to the closure circuit 68, is adapted to cause an abrupt amplitude modulation in the audio output that simulates the build-up and sudden release of energy that occurs during the pronunciation of such phoneme combinations. The vocal delay control parameter (VD) is utilized primarily during certain fricative-to-vowel phonetic transitions wherein the amplitude of the fricative constituent would otherwise be rapidly decaying at the same time the amplitude of the vocal constituent is rapidly increasing. The vocal delay control parameter thus serves to delay the transmission of the vocal amplitude (VA) control signal under such circumstances. The closure delay control parameter (CLD) is similarly utilized primarily during certain vowel-to-fricative phonetic transitions wherein it is desirable to delay the transmission of the closure (CL) and fricative amplitude (FA) control parameters in the same manner as that discussed in connection with the vocal delay control parameter. The pause control parameter (PAC) is generated whenever a pause phoneme is selected to insert a period of silence into the speech pattern. However, because the articulation pattern of the vocal tract is "frozen" during a pause phoneme until all of the excitation energy in the vocal tract is completely dissipated, an additional important function is also provided by the pause phoneme. In particular, certain words whose endings tend to "trail off", such as those ending in nasal phonemes, sound as if an additional phoneme has been included when the articulation pattern of the last phoneme is abruptly changed before the excitation energy in the vocal tract has completely dissipated. For example, the word "sun" may sound more like "suna". This is due to the fact that the residual excitation energy in the vocal tract is vocalized as something other than an "n" after the duration of the "n" phoneme period. Insertion of a pause phoneme following the "n" phoneme in this example will therefore improve speech recognition by freezing the articulation pattern of the "n" phoneme until all fricative and vocal excitation energy is dissipated. The final control parameter is the phoneme timing control parameter which is generated for each phoneme and is used to establish the period of production for the phoneme.

Figure 12:
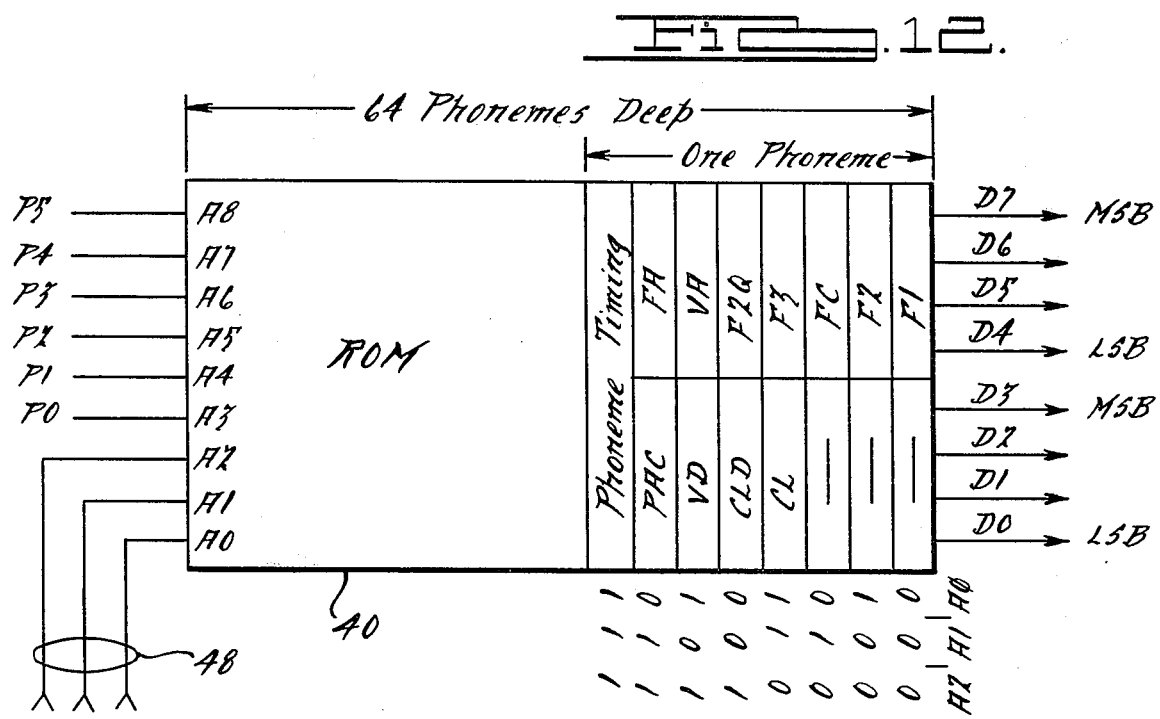
FIG. 12 is a diagrammatical view of the parameter storage ROM indicating the manner in which the control parameter values are stored in the ROM.

The parameter storage ROM 40 in the preferred embodiment is configured as shown in FIG. 12. In particular, the ROM 40 has stored therein twelve control signal parameter values for each of the 64 phonemes identifiable by phoneme select bits 22. Each control signal parameter has four bits of resolution except for the phoneme timing control signal parameter which has seven bits of resolution. Thus for example, as indicated in FIG. 12, when the parameter select bit 48 are equal to 011, the closure control signal parameter (CL) will be present at the D0–D3 data outputs of ROM 40 and the F3 control signal parameter will be present at the D4–D7 data outputs of ROM 40. Similarly, when parameter bits 48 are equal to 100, then the closure delay (CLD) and the F2Q control signal parameters will be present at the D0–D3 and D4–D7 data outputs, respectively, of parameter ROM 40. In the preferred embodiment, the frequencies of the parameter select bits 48 are 40 KHz, 20 KHZ, and 10KHz. Thus, since phoneme durations vary from approximately 50–250 milliseconds, it will be appreciated that each control signal parameter will be generated on the data output lines D0–D7 of parameter storage ROM 40 a minimum of approximately 500 times during the period of each phoneme. A timing diagram illustrating the relationship between the parameter select bits 48 at the A0–A2 address inputs of ROM 40 and the data outputs D0–D7 of ROM 40 is shown in FIG. 11.

The parameter select signals on lines 48 are generated at the Q4–Q6 outputs of a 10-bit ripple counter 34 which is clocked by the master clock signal, which in the preferred embodiment is set at 1.28 MHz. As will subsequently be appreciated by those skilled in the art, variation of the master clock frequency will vary the overall pitch and frequency composition of the audio output. In addition, by varying the master clock frequency above or below that required for normal speech ranges, the present system can be utilized to produce highly textured sound effects.

The Q0–Q3 outputs of ripple counter 34 are provided to the data (D) inputs of a first 4-bit latch 70 and the Q4–Q6 and Q9 outputs of counter 34 are provided to the data (D) inputs of a second 4-bit latch 72. The three high order Q outputs from latch 70 comprise the BIT 0, BIT 1 and BIT 2 clock signals which are provided to the digital transition circuit 50 to be subsequently described. The remaining Q output signal from latch 70 is provided on line 73 to an R-S flip-flop 74 so as to produce at its SET output terminal a clock signal ($\beta1$) at twice the frequency of the BIT 0 clock signal and opposite in phase relative thereto. The $\beta1$ clock signal is also utilized in the digital transition circuit 50. The three low order Q outputs from latch 72 comprise the A0–A2 clock signals which are utilized in various sections of the system to monitor which control parameter is present and to de-multiplex the transitional control parameters. The A0–A2 clock signals have the same frequencies as the parameter select signals provided on lines 48 to A0–A2 address inputs of ROM 40, only delayed slightly relative thereto.

Figure 14:
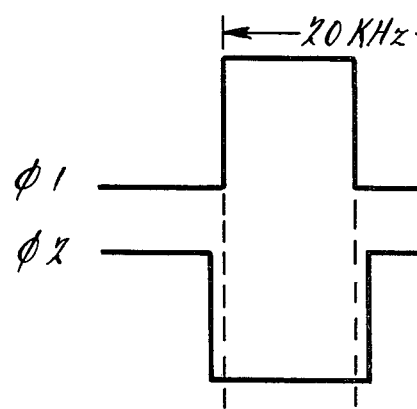
FIG. 14 is a timing diagram illustrating the timing relationship between the $\phi1$ and $\phi2$ non-overlapping clock signals utilized in the capacitive switching circuitry.

In addition, it will be noted that the Q3 output signal from ripple counter 34 is also provided to a pair of R-S flip-flops 77 and 78 so as to produce at the RESET output terminals thereof slightly non- overlapping clock signals $\emptyset1$ and $\emptyset2$. As shown in FIG. 14, the $\emptyset1$ and $\emptyset2$ clock signals are opposite in phase and in the preferred embodiment have a frequency of 20 KHz. The $\emptyset1$ and $\emptyset2$ clock signals are utilized principally in connection with the implementation of the unique capacitive switching parameter control technique to be subsequently described, although the $\emptyset1$ and $\emptyset2$ clock signals are also utilized simply as convenient clock signals. Similarly, the Q5 output signal from ripple counter 34 is additionally provided to a pair of R-S flip-flops 75 and 76 so as to produce at the RESET output terminals thereof a second pair of slightly non-overlapping clock signals P1 and P2 which are also opposite in phase in the same manner as clock signals $\emptyset1$ and $\emptyset2$, and have a frequency of 5 KHz in the preferred embodiment. The P1 and P2 clock signals are utilized solely in the subphoneme clock circuit 42 (FIG. 7) to be described subsequently in greater detail.

The parameter values stored in ROM 40 which are generated on the high order data output lines D4–D7 comprise vocal tract control parameters which require dynamic transitioning and are therefore provided to the digital transition circuitry 50 to be subsequently described. The parameter values stored in ROM 40 which are generated on the low order data output lines D0–D3, however, are essentially on/off signals or timing signals which require no transitioning and are therefore provided directly to the phoneme timing, pause timing and delay circuitry.

The operation of the phoneme timing circuit will now be explained. The seven least significant bits D0–D6 from the data output of parameter storage ROM 40 are provided to the data (D) inputs of a 7-bit latch 80 which is clocked by a signal received on line 85 from the No. 7 output channel of an 8-channel multiplexor 86. The A, B and C binary control inputs of multiplexor 86 are tied to the A0–A2 clock signals from the output of latch 70 in timing circuit 38. Thus, it will be appreciated, that when parameter selector bits A0–A2 are equal to 111, indicating that the phoneme timing control signal parameter is present on the data outputs (D0-D7) of parameter storage ROM 40, the No. 7 output channel of multiplexor 86 will go HI, thereby clocking into latch 80 the value of the phoneme timing control signal parameter.

Figure 7:
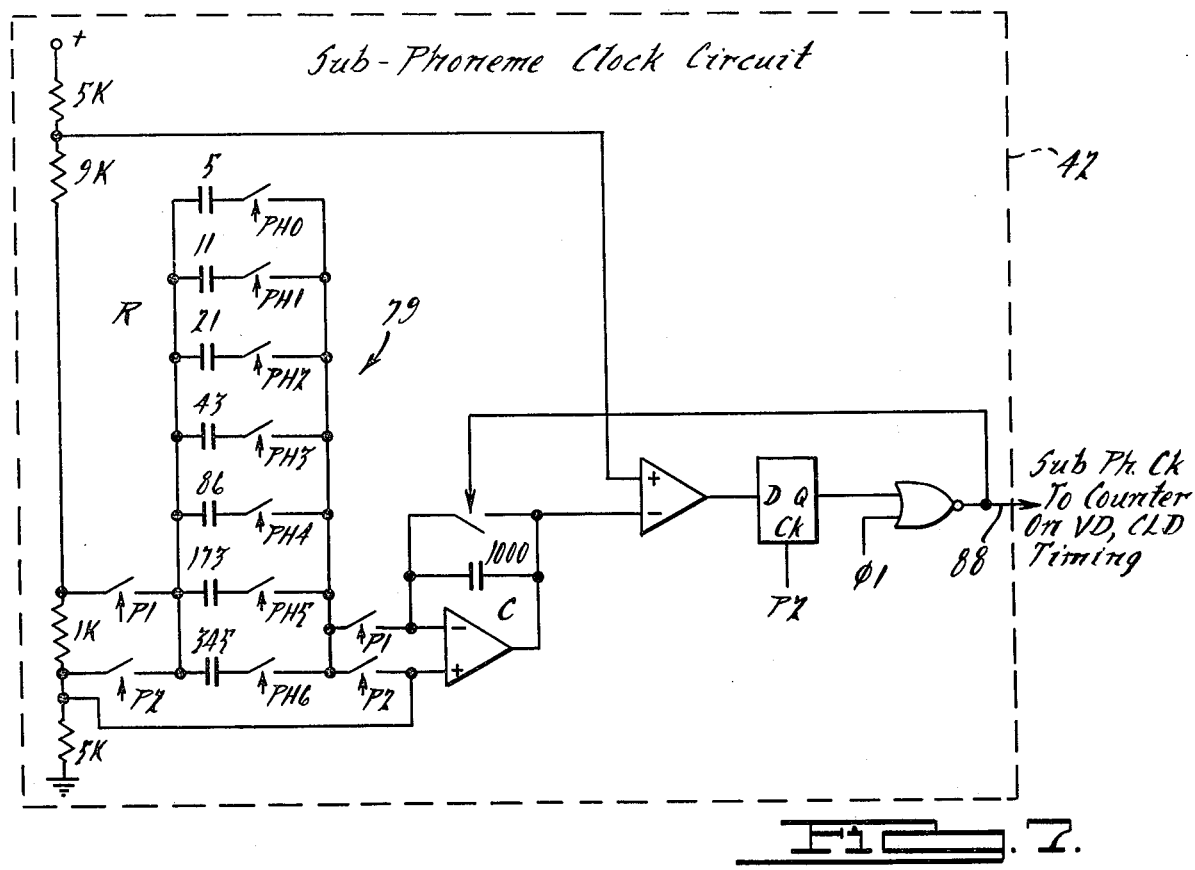

With additional reference to FIG. 7, the seven parallel outputs (PH0-PH6) from latch 80 are provided to the sub-phoneme clock circuit 42 which effectively comprises an oscillator circuit whose frequency is controlled by the value of the seven output bits from latch 80. In particular, the outputs from latch 80 (PH0-PH6) control the on/off state of seven analog switches, as indicated, which are individually connected in series with one of seven binary weighted, parallel connected capacitors. As will subsequently be described in greater detail in connection with the description of the vocal tract, by rapidly switching the capacitor network 79 in the manner shown under the control of the P1 and P2 non-overlapping clock signals, a resistance value is effectively simulated which is equal to the inverse of the product of the switching frequency (P1) and the resulting capacitance value of capacitor network 79. In order words, the simulated R value in the preferred embodiment is determined by the following:

$$R = \frac{1}{5K(C_{79})}$$

Therefore, the frequency of the output signal from the oscillator 42 on line 88 is given by the product of the resulting resistance value (R) and the fixed capacitance value (C) in the RC timing network of the oscillator 42.

Returning to FIG. 2, the output signal on line 88 from sub-phoneme clock circuit 42 is provided to the clock input of the phoneme timing counter 84 and thus determines the count rate of the counter. The duration of the phoneme is determined by the period of time it takes for the counter 84 to attain a count of 16. In particular, when the count outputs (Q0-Q3) of counter 84 are equal to 0000, the output of NOR-gate 90 will go HI, thereby providing a HI signal to the data input of flip-flop 92. After a brief delay—specifically, two pulses from clock signal P2—the output of NAND-gate 94 will go LO to thereby set output latch 28 via inverter 96 and force the A/R line 30 HI to signal that new phoneme data is required.

The operation of the vocal delay and closure delay circuit will now be described. As previously mentioned the purpose of the vocal delay and closure delay control signal parameters is to delay for a predetermined portion of the phoneme period the transmission of the vocal amplitude and fricative amplitude control signals respectively during certain vowel/fricative phonetic transitions. This is accomplished in the following manner. The four count outputs (Q0-Q3) from the the phoneme timing counter 84 are provided through inverters 100 to the B inputs of a 4-bit magnitude comparator 82. The A inputs of magnitude comparator 82 are tied to the D0-D3 data outputs of the parameter ROM 40. The A=B output of magnitude comparator 82 is provided on line 102 to a pair of NAND-gates 104 and 106. The other input to NAND-gate 104 is connected via line 110 to the No. 5 output channel of multiplexor 86 and the other input to NAND-gate 106 is connected via line 108 to the No. 4 output channel of multiplexor 86. Thus, it will be appreciated that when the A2-A0 clock signals provided to the binary control inputs A, B and C of multiplexor 86 are equal to 101, indicating that the vocal delay (VD) control signal parameter is present at the D0-D3 data outputs of parameter storage ROM 40, and the count outputs (Q0-Q3) of phoneme timing counter 84 is equal to the parameter value of the vocal delay control signal, both inputs to NAND-gate 104 will be HI, thereby forcing the output of NAND-gate 104 LO to set flip-flop 112. Similarly, when the A2-A0 clock signals are equal to 100, the No. 4 output channel of multiplexor 86 on line 108 will go HI, indicating that the closure delay control signal parameter is present on the D0-D3 data outputs of parameter storage ROM 40. Consequently, when the count output of phoneme counter 84 simultaneously attains a count equal to the parameter value of the closure delay control signal, the A=B output of magnitude comparator 82 on line 102 will also go HI, thereby providing HI signals to both inputs of NAND-gate 106 and forcing its output LO to set flip-flop 114. As will subsequently be seen, the output signals from flip-flops 112 and 114 are provided to the freeze transition circuit 46 (FIG. 3), which effectively inhibits the transition process in the digital transition circuit 50 during transitioning of the vocal amplitude and fricative amplitude control signals parameters. Flip-flops 112 nd 114 are reset at the end of each phoneme period by a LO RESET pulse on line 124 from the output of AND-gate 122. The output of AND-gate 122 is forced LO at the end of each phoneme period by the HI RESET pulse produced by phoneme counter 84 on line 30 which is inverted by inverter 120 and provided to the input of AND-gate 122. Note, the "equal to" output of magnitude comparator 82 is also reset to a LO level at the beginning of each new phoneme period when the count output (A0-Q3) of phoneme counter 84 is equal to 0000 by the resulting HI signal produced at the output of NOR-gate 90 which is inverted by inverter 98.

In addition, it will also be noted that the closure delay control signal parameter (CLD) is also utilized to inhibit the transmission of the closure (CL) control signal parameter to the closure circuit 68 (FIG. 1). In particular, during the closure delay period the output of flip-flop 114 is LO, and hence a LO signal is provided on line 126 to one of the inputs of a three-input NAND-gate 128. The remaining two inputs of NAND-gate 128 are connected to line 116, which is tied to the No. 3 output channel of multiplexor 86, and to line 115 which is connected to the D3 data output of the parameter storage ROM 40. When a closure signal is present, the D0-D2 data outputs from ROM 40 are not utilized since the closure control signal is simply an on/off type signal. Therefore, only the state of data output D3 from ROM 40 on line 115 is monitored during the closure parameter period when the A2-A0 clock signals are equal to 011 and the No. 3 output channel from multiplexer 86 on line 116 is HI. However, even if HI signals are presented on both lines 115 and 116, the output of NAND-gate 128 will not go LO to reset flip-flop 132 and produced a LO closure signal at the output of AND-gate 136 until flip-flop 114 is set upon termination of the closure delay period and a HI signal is presented on line 126. When the closure delay function is not present and the output of flip-flop 114 is HI, a LO closure signal will be produced at the output of NAD-gate 136 when HI signals are coincidentally detected on both line 115 from from the D3 data output of ROM 40 and line 116 from the No. 3 output channel of multiplexer 86. The closure signal is terminated when the output of NAND-gate 130 goes LO to set flip-flop 132, which occurs when the No. 3 output channel from multiplexer 86 on line 116 is HI and the D3 data output from ROM 40 is LO, indicating that the closure function is no longer desired. This typically will occur at the beginning of the following phoneme period if the following phoneme does not also require the closure function, since the output from the closure delay flip-flop 114 on line 126 will always be at least momentarily HI at the beginning of each phoneme period.

In addition, it will be noted that a closure control signal is also produced whenever the values of both the vocal amplitude (VA) and fricative amplitude (FA) control parameters are equal to zero. In other words, when both the $\overline{VA}$ and $\overline{FA}$ signals from NOR-gates 190 and 192 (FIG. 3) are HI, the output of NAND-gate 134 will go LO, thereby producing a LO closure signal at the output of AND-gate 136. This serves to completely silence the vocal tract during periods when no excitation energy is present in the vocal tract to prevent buzzing and other forms of noise from being produced during pause periods.

The remaining non-transitional control parameter produced at the D0-D3 data outputs of parameter storage ROM 40 is the pause control parameter (PAC). As previously noted, the pause control parameter is generated whenever a silent phoneme is desired, and also serves to freeze the formant positions of the vocal tract until all excitation energy is dissipated. The pause control parameter is similar to the closure control parameter (CL) in that it is an on/off type parameter and therefore requires only a signal data bit. For convenience, the D3 data output of parameter storage ROM 40 is again selected and the D0-D2 data outputs are not used. The D3 data output from ROM 40 on line 115 is provided to the input of a NAND-gate 138 which has its other input connected to the No. 6 output channel of multiplexer 86. Accordingly, when the A2-A0 clock signals are equal to 110 causing the No. 6 output channel of multiplexer 86 to go HI, indicating that the pause control parameter is present at the D0-D3 data outputs of ROM 40, and the D3 data output on line 115 is also HI, the output of NAND-gate 138 will go LO and set flip-flop 142. The output of flip-flop 142 is in turn provided to the input of an AND-gate 146 which has its other input connected to the output of NAND-gate 144. The inputs to NAND-gate 144 are connected to the $\overline{VA}$ and $\overline{FA}$ signals from the outputs of NOR-gates 190 and 192 in FIG. 3. Therefore, since vocal and/or fricative excitation energy are always present during non-silent phonemes, the output of NAND-gate 144 will normally be HI. Consequently, when flip-flop 142 is set at the beginning of a pause phoneme, a HI signal will be produced at the output of AND-gate 146, which is provided to the freeze transition circuit 46 (FIG. 3) and, as will subsequently be seen, is effective to inhibit the digital transition circuit to thereby hold the transitional control parameters at their current values. The HI "freeze formants" signal at the output of AND-gate 146 will be terminated, however, as soon as all of the vocal and fricative excitation energy has been completely dissipated, or at the end of the pause phoneme period, whichever occurs first. In particular, when both the $\overline{VA}$ and $\overline{FA}$ signals go HI, the output of NAND-gate 144 will go LO and thereby force the output of AND-gate 146 LO. Conversely, if the output of NAND-gate 144 is still HI at the end of the pause phoneme period when the D3 data output of ROM 40 on line 115 goes LO, then the resetting of flip-flop 142 caused by the resulting LO signal produced at the output of NAND-gate 140 will force the output of AND-gate 146 LO.

Figure 3A:
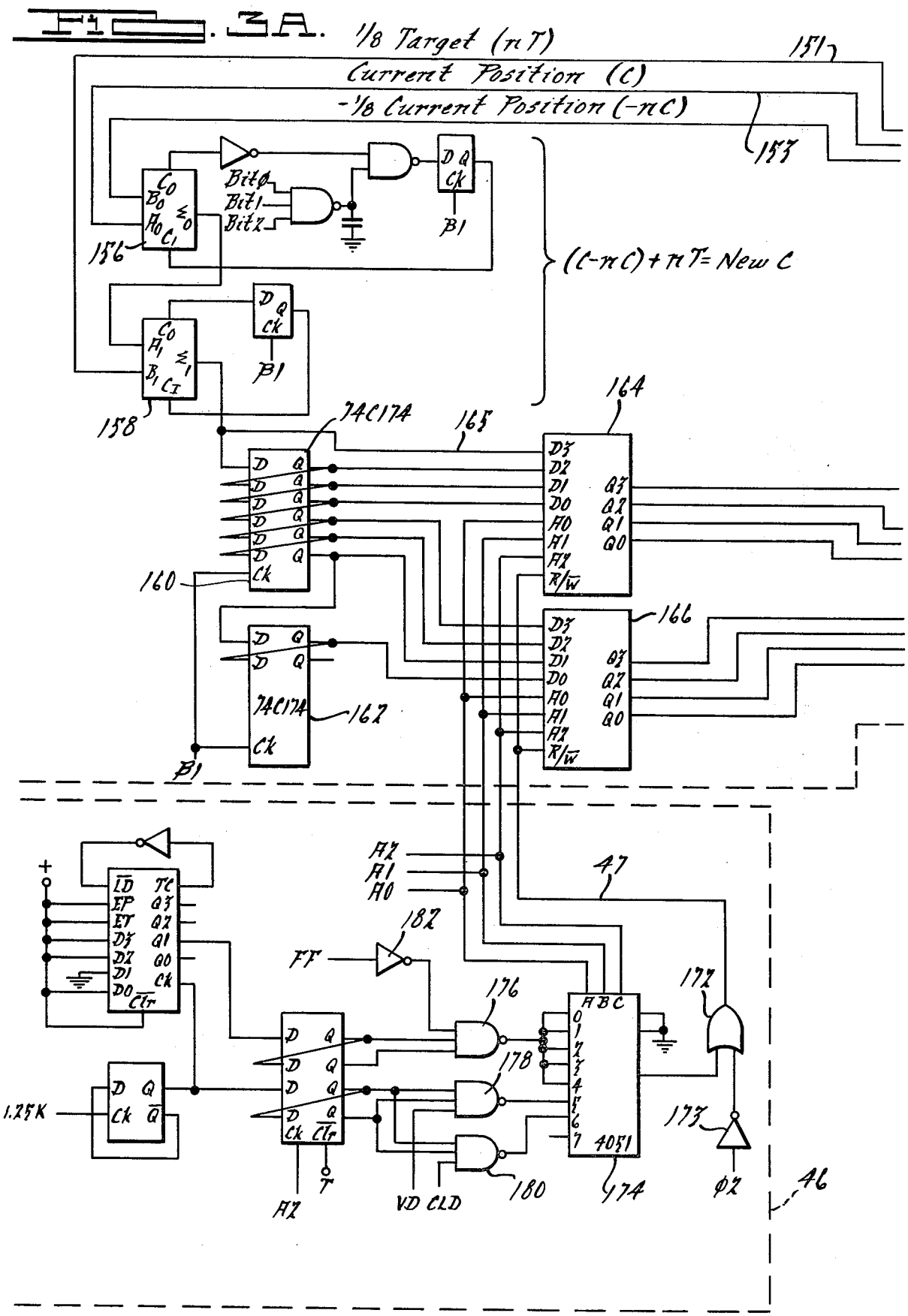
Figure 3B:
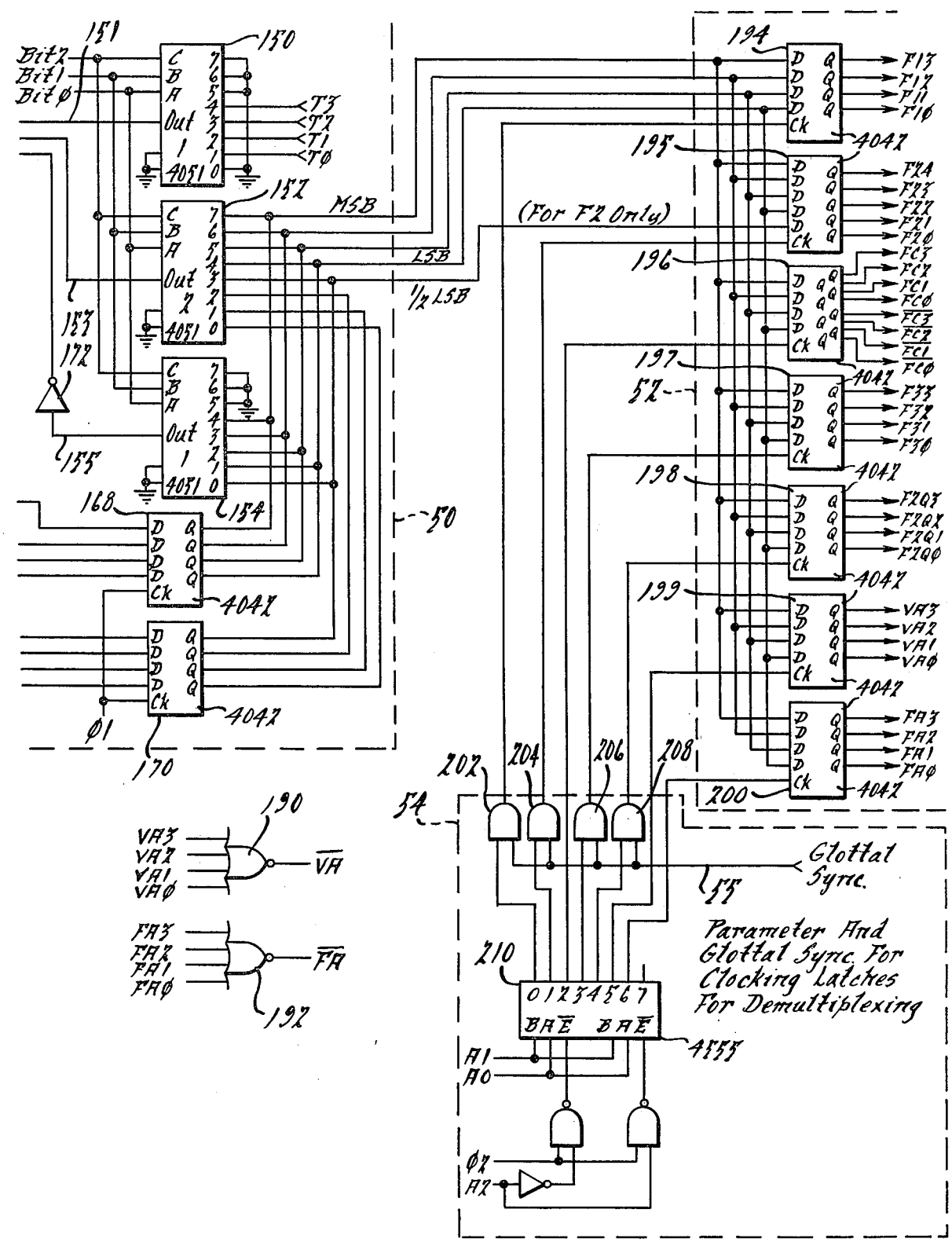

With particular reference to FIG. 3, the operation of the digital transition circuit 50 will now be explained. As previously noted, that purpose of the digital transition circuit 50 is to provide a gradual change in the values of the vocal tract control parameters from the old or "current" values to the new or "target" values. The four parameter lines T0-T3 from the D4-D7 data outputs of parameter storage ROM 40 are provided to the 1-4 input channels of an 8-channel multiplexer 150. The A, B and C binary control inputs of multiplexer 150 are connected to the BIT 0, BIT 1, and BIT 2 transition clock signals, respectivley, from the timing circuit 38 (FIG. 2). The timing relationship between the BIT 0-BIT 2 transition clock signals and the A0-A2 parameter clock signals is illustrated in FIG. 11. As can readily be seen from the timing diagram in FIG. 11, the BIT 0-BIT 2 clock signals define eight states within each state defined by clock signals A0-A2. It will be recalled that clock signals A0-A2 define which parameter is present on the four parameter lines T0-T3 from the D4-D7 data outputs of ROM 40.

Multiplexer 150 thus serves to convert the parallel input data on parameter lines T0-T3 to serial data on output line 151 in preparation for the serial arithmetic functions to be subsequently performed. In addition, however, because the parallel output from the digital transition circuit is ultimately taken off the four most significant bits in the 8-bit parallel output signal from output latches 168 and 170, and the parameter input lines T0-T3 to the transition circuit are connected to input channels 1-4 of multiplexer 150 and are hence shifted three bits down with respect to the output, multiplexer 150 also serves to effectively divide the "target" parameter value by $2^3$ or eight.

The serial output from multiplexer 150, which is therefore equal to $\frac{1}{8}$ of the target parameter value, is provided on line 151 to the B input of a single bit full adder 148. The A input of adder 158 is connected to the sum output ($\Sigma$) of a second single bit full adder 156. The A input of adder 156 is connected to the serial output of a second 8-channel multiplexer 152 which merely serves to convert the resulting parallel output signal from the digital transition circuit 50 back to a serial signal. Thus, the signal present on line 153 from the serial output of multiplexer 152 represents the most recent or current value of the control parameter. The B input of adder 156 is connected to the serial output of a third 8-channel multiplexer 154 which also serves to convert the parallel output signal from the digital transition circuit 50 to a serial signal. However, because the four most significant bits in the output signal from latch 168 are shifted down three bits and connected to the 1-4 input channels of multiplexer 154, multiplexer 154 also serves to effectively divide the current parameter value by eight. Thus, since the serial output from multiplexer 154 on line 155 is provided to the B input of adder 156 through an inverter 172, it will be appreciated that adder 156 effectively subtracts $\frac{1}{8}$ of the current parameter value from the current parameter value and provides the total to the A input of adder 158. Adder 158 then adds to the total from adder 156 $\frac{1}{8}$ of the target parameter value. The value of the resulting signal at the sum output ($\Sigma$) of adder 158 on line 165, which represents the "new" current parameter value, is therefore given by the following equation:

(Current−⅛ Current)+⅛ Target=New Current

The serial signal on line 165 from the sum output (Σ) of adder 158 is converted back to a parallel signal by a pair of Hex D flip-flops 160 and 162, and the resulting 8-bit signal is provided to the eight data inputs (D0–D3) of a pair of temporary storage RAMs 164 and 166. The address inputs (A0–A2) of the RAMs 164 and 166 are connected to the parameter clock lines A0–A2. Thus, it will be appreciated that as long as the R/$\overline{\text{W}}$ inputs of RAMs 164 and 166 remain properly enabled, each successive new current parameter value will be properly stored in RAMs 164 and 166 in the address locations identified by parameter clock signals A0–A2.

The read/write (R/$\overline{\text{W}}$) inputs of both RAMs 164 and 166 are connected to the output of an OR-gate 172 which has one of its inputs connected to the serial output of a multiplexer 174 and the other of its inputs tied to the ∅2 clock line through an inverter 173. The A, B, and C binary control inputs of multiplexer 174 are also tied to the A0–A2 parameter clock lines. The five low order input channels of multiplexer 174 (nos. 0–4) are connected to the output of a first NAND-gate 176, the No. 5 input channel is connected to the output of a second NAND-gate 178, and the No. 6 input channel is connected to the output of a third NAND-gate 180. One of the inputs to NAND-gate 176 is tied through an inverter 182 to the "freeze formants" (FF) signal line, such that when a HI freeze signal is produced, the output of NAND-gate 176 will go HI. Similarly, one of the inputs to each of NAND-gate 178 and 180 is connected to the vocal delay (VD) and closure delay (CLD) signal lines, respectively, such that when a LO vocal delay or closure delay signal is produced, the outputs of NAND-gates 178 and 180 respectively, will go HI.

Thus, it will be appreciated that, absent a vocal delay (VD), closure delay (CLD), or freeze formants (FF) signal, the serial output of multiplexer 174 will remain LO and the R/$\overline{\text{W}}$ inputs of RAMs 164 and 166 will be clocked under the control of the ∅2 clock signal. Accordingly, new current for each parameter will be written into RAMs 164 and 166 and then subsequently read out onto the data outputs Q0–Q3 of RAMs 164 and 166. With the frequency of the ∅2 clock signal in the preferred embodiment set at 20 KHz, a parameter will normally transition to approximately 70% of its new target position in 33 msec.

However, when a "freeze formants" (FF) signal is produced, the serial output of multiplexer 174 will go HI to inhibit the R/W inputs of RAMs 164 and 166 during the periods when parameter bits A2–A0 are equal to 000, 001, 010, 011, and 100, which corresponds to the periods of production for the F1, F2, FC, F3, and F2Q control parameters. Consequently, when this occurs, new values for these parameters will not be written in RAMs 164 and 166 and the values of these control parameters will effectively be frozen at their current values for as long as the FF signal is produced. Similarly, the presence of a vocal delay (VD) signal will cause the serial output of multiplexer 174 to go HI and inhibit the R/W line 47, to RAMs 164 and 166 during the "101" or vocal amplitude (VA) parameter period and prevent new values for the vocal amplitude parameter from being written into RAMs 164 and 166 until the vocal delay signal is terminated. Finally, when a closure delay signal (CLD) is generated, the serial output of multiplexer 174 will go HI during the "110" or fricative amplitude (FA) parameter period and thereby hold the value of the fricative amplitude parameter until the closure delay signal is terminated.

The eight parallel data outputs Q0–Q3 from RAMs 164 and 166 are latched into a pair of 4-bit output latches 168 and 170 under the control of the ∅1 clock signal. The four most significant bits, as previously noted, or the Q outputs from output latch 168 are then de-multiplexed by a plurality of latches 194–200 to provide the resulting F1, F2, FC, $\overline{\text{FC}}$, F3, F2Q, VA, and FA transitional control signals which are provided to the various sections of the vocal tract 60. In particular, the four Q outputs from output latch 168 are connected in parallel to the date (D) inputs of each of the de-multiplexing latches 194–200. Latches 194–200 are clocked under the control of the A0–A2 parameter clock signals which are connected to the A, B and $\overline{\text{E}}$ inputs of a 3-to-8 line decoder 210. Output channels 2, 5 and 6 of decoder 210 are tied directly to the clock inputs (CK) of latches 196, 199 and 200, respectively. Output channels 0, 1, 3 and 4, however, are and'ed with the glottal sync pulse on line 55 by AND-gates 202–208 before connection to the clock inputs (CK) of latches 194, 195, 197 and 198. Thus, it will be appreciated that the transitional values for parameters FC, $\overline{\text{FC}}$, VA, and FA are clocked into latches 196, 199 and 200, respectively, immediately upon updating, while the transitioned values for parameters F1, F2, F3, and F2Q are clocked into latches 194, 195, 197 and 198, respectively, in synchronization with the glottal pulse from the glottal source 58 (FIG. 6).

In addition, it will be noted that demultiplexing latch 195 which produces the transitioned F2 control signal parameter, is also provided with the fifth most significant bit (½ LSB) in the 8-bit output signal from digital transition circuit 50 so that the transitioned value for the F2 control parameter has five bits of resolution. This is done to increase the step resolution of the F2 control parameter due to the greater frequency span of the F2 resonant filter in the vocal tract 60 (FIG. 4).

Turning now to FIG. 6, the unique glottal source circuit 58 of the present invention will now be explained. The period of the glottal pulse signal is determined by the time it takes for an 8-bit counter, comprised of cascaded 4-bit jam counters 220 and 222, to count from a preset count to all ones. Specifically, counters 220 and 22 are clocked by the 20 KHz ∅2 clock signal. The three most significant data inputs (L1–L3) of counter 222 are connected to the inverse of the three least significant bits (F10–F12) in the transitioned F1 control parameter from the output of latch 194 (FIG. 3). The inverse of the most significant bit (F13) in the transitioned F1 control parameter and the two inflection control bits (I1, I2) 56 from the 8-bit input command word are provided to the three least significant data inputs (L0–L2) of counter 220. The data present at the inputs (L0–L3) of counters 220 and 222 is loaded into the counters to preset the counters at the end of each glottal pulse period when a HI signal is produced at the carry output (TC) of counter 220, which is inverted by inverter 228 and provided on line 230 to the load inputs ($\overline{\text{LD}}$) of counters 220 and 222. Acccordingly, since the frequency of the carry out signal from counter 220 determines the frequency of the glottal pulse signal, it will be appreciated that the fundamental frequency of the glottal pulse signal is controlled by the setting of the inflection control bits 56 and, to a lesser degree, by the value of the F1 control parameter. Since the F1 control parameter is inverted, the fundamental frequency of the glottal signal will vary inversely with respect thereto. In other words, when the value of the F1 parameter decreases, the pitch of the audio output will increase. This serves to provide a degree of automatic inflection control in the audio output in addition to the programmable changes in pitch available via the inflection control bits 56. It will be noted, however, that since the two inflection control bits 56 are provided to higher order data inputs of counters 220 and 222 than the $\overline{F1}$ parameter bits, the automatic inflection changes which result from movement in the resonant frequency of the F1 resonant filter will have a less pronounced effect on the pitch of the audio output than the programmed changes made via the inflection control bits 56.

In addition, it will be noted that a third 4-bit jam counter 224 is provided which is loaded with the same data and enabled simultaneously with counter 220. The only difference is that counter 224 is clocked by the A0 clock signal and therefore counts twice as fast as counter 220. The carry output (TC) of counter 224 is connected to the SET input of an R-S flip-flop 226 and the RESET input of flip-flop 226 is connected to the carry output (TC) of flip-flop 220. Thus, the output of flip-flop 226 on line 65 will be set LO at the beginning of each glottal pulse period and go HI halfway through the glottal pulse period. The signal on line 65, referred to as the FGATE signal, is provided to the white noise generator circuit 64 (FIG. 8) to inhibit the white noise signal during the initial half of the glottal pulse period for voiced fricative phonemes when both vocal and fricative excitation energy are present at the same time.

The waveform of the glottal pulse signal is generated by a 4-bit counter 234 and a pair of 8-to-1 analog multiplexers 242 and 244. Counter 234 is clocked by the Q1 output of another 4-bit counter 236 which is in turn clocked by the 20 KHz $\emptyset 2$ clock signal. Thus, counter 236 effectively serves to divide the frequency of the 20 KHz $\emptyset 2$ clock signal by four so that the frequency of the clock signal provided to counter 234 is 5 KHz. The three least significant count outputs (Q0-Q2) from counter 234 are connected in parallel to the A, B and C binary control inputs of multiplexers 242 and 244. The most significant count output (Q3) from counter 234 is connected to the inhibit input (INH) of multiplexer 242 and through an inverter 245 to the inhibit input (INH) of multiplexer 244, so that for the first eight counts (0-7) of counter 234, multiplexer 244 is disabled and during the second eight counts (8-15) of counter 234, multiplexer 242 is disabled. The parallel inputs (0-7) of both multiplexers 242 and 244 are each shown tied to a variable resistor connected between a voltage source ($V_p$) and ground, which is intended to represent a presettable d.c. signal level. As will be seen, the d.c. levels are preset to appropriate values to provide the desired glottal waveform approximation.

The serial outputs of multiplexers 242 and 244 are tied in common and provide the glottal output signal on line 246. The d.c. analog level produced on output line 246 is therefore determined by the count output of counter 234 which is provided to the A, B and C binary control inputs of multiplexers 242 and 244. In other words, each of the sixteen counts from the output of counter 234 uniquely identifies one of the sixteen inputs to multiplexers 242 and 244. For example, when the count output of counter 234 is equal to 0110, the d.c. level present at the No. 6 input channel of multiplexer 242 will be produced on output line 246. Similarly, when the count output of counter 234 is equal to 1101, the d.c. level present at the No. 5 input channel of multiplexer 244 will be produced on output line 246. In the preferred embodiment, wherein the $\emptyset 2$ clock signal is set at 20 KHz, the 5 KHz count rate of counter 234 results in a 0.2 msec. segment in the glottal output signal on line 246 for each count of counter 234. Thus, it will be appreciated that by properly presetting the d.c. signal levels provided to the inputs of multiplexers 242 and 244, any desired glottal waveform may be generated. In the preferred embodiment, it was determined that an 8-segment glottal pulse of the type illustrated in FIG. 10 was adequate, and therefore only a single 8-to-1 multiplexer was used.

The carry output (TC) from counter 234 is returned to its enable (EP) input through an inverter 238 to disable the counter once the counter has attained a count of 1111 and prevent it responding to additional clock pulses. The purpose of this is to hold counter 234 at its last count so that the last d.c. level produced on output line 246 will be maintained for the duration of the glottal period. Specifically, it will be noted that the carry output of counter 220, which determines the glottal period, is provided through inverter 228 on line 230 to the input of an OR-gate 232, which has its other input tied through an inverter 231 to the $\emptyset 1$ clock signal. The output from OR-gate 232 is connected to the clear inputs ($\overline{CLR}$) of both counters 234 and 236. Thus, it will be appreciated that at the end of the glottal pulse period when a HI signal is produced at the carry output (TC) of counter 220, a LO signal is provided to the $\overline{CLR}$ inputs of counters 234 and 236, thereby setting all four outputs (Q0-Q3) of each counter to zero to initiate a new glottal pulse.

When the Q0-Q3 count outputs of counter 234 are reset to zero at the beginning of each glottal pulse, a HI output pulse is produced on glottal sync line 55 at the output of NOR-gate 240 which has its four inputs connected to the four outputs of counter 234. As previously noted, the glottal sync pulse on line 55 is provided to the transition circuitry (FIG. 3) to latch the F1, F2, F3 and F2Q output latches 194, 195, 197 and 198, respectively, in synchronization with the beginning of each glottal pulse. The purpose of synchronizing the transitioning of the F1, F2, F3 and F2Q control parameter values with the beginning of the glottal pulse is to prevent the production of audible random noise which would be produced if the CMOS switches in the variable capacitance networks in the vocal tract were permitted to switch during the "rest" period of the glottal pulse signal when no excitation energy is present in the vocal tract.

Figure 8:
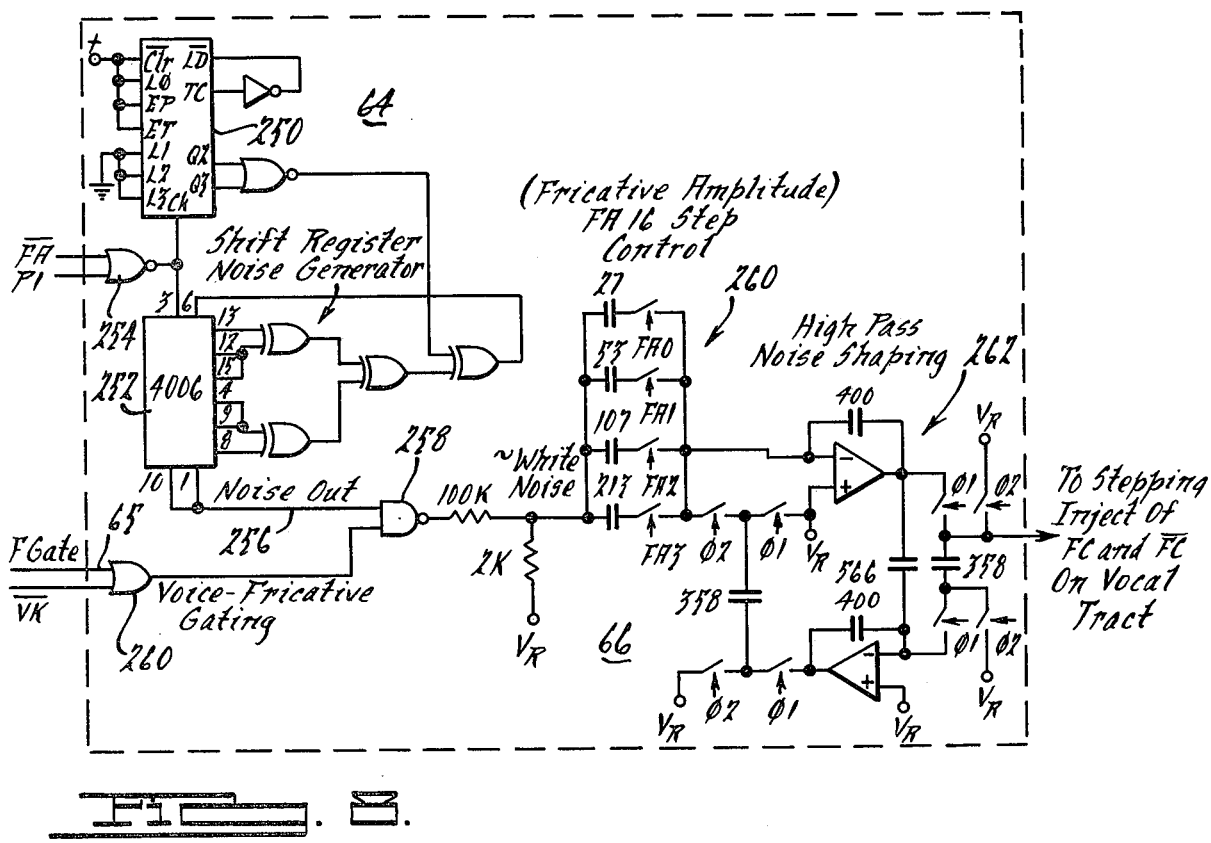

Referring now to FIG. 8, the fricative excitation signal is produced by a white noise generator comprised of a jam counter 250 and an 18-stage static shift register 252, which generates a random white noise output signal on line 256. Both jam counter 250 and shift register 252 are clocked by the P1 clock signal which is provided to their clock inputs (CK) through a NOR-gate 254. The other input of NOR-gate 254 is connected to the inverse of the fricative amplitude control parameter ($\overline{FA}$) from the output of NOR-gate 192 (FIG. 3). Thus, when no fricative excitation energy is needed, the noise generator is disabled to avoid any unnecessary interference to the remainder of the system.

The white noise output signal on line 256 is provided to the input of a NAND-gate 258 which has its other input connected to the output of an OR-gate 260. The inputs to OR-gate 260 are tied to the FGATE signal line 65 and the $\overline{VA}$ signal line from the output of NOR-gate 190 (FIG. 3). During voiced fricative phonemes which require both vocal and fricative excitation energy, both $\overline{VA}$ and $\overline{FA}$ signals will be LO. Thus, it will be appreciated that the FGATE signal on line 65, which, it will be recalled, goes HI during the latter half or "rest" portion of the glottal signal period, will enable NAND-gate 258 and effectively gate on the white noise signal during the latter inactive portion of the glottal signal period.

The white noise signal from the output of NAND-gate 258 is then provided to the fricative amplitude control circuit 260 which controls the amplitude of the white noise signal in accordance with the value of the fricative amplitude control parameter (FA). The resulting white noise signal is then filtered by a high pass noise shaping filter before injection into the vocal tract 60 under the control of the fricative control signal parameter (FC) and its inverse $(\overline{FC})$. The operation of the fricative amplitude control circuit 260 and the high pass noise shaping circuit 262, which utilize the same capacitive switching technique employed in the vocal tract 60, will become readily apparent from the following description of the vocal tract 60.

With reference now to FIGS. 4 and 5, a circuit diagram of the novel vocal tract 60 of the present invention is shown. The vocal tract 60 is principally comprised of four cascaded resonant filters, designated F1, F2, F3 and F5. The resonant frequencies of the F1, F2, and F3 resonant filters are variable and are controlled in accordance with F1, F2 and F3 control parameters, whereas the resonant frequency of the F5 resonant filter is fixed. The glottal source or vocal excitation signal is provided through the vocal amplitude control circuit 62, which controls the amplitude of the glottal signal in accordance with the vocal amplitude (VA) control parameter, and is then injected serially into the F1 resonant filter of the vocal tract. The fricative excitation signal is injected in parallel into the F2 and F5 resonant filters of the vocal tract 60 under the control of the fricative control parameter (FC) and the inverse of the fricative control parameter $(\overline{FC})$, respectively. In addition, it will be noted the "Q" or bandwidth of the F2 resonant filter is also controlled by the F2Q control parameter, which as previously explained is used principally during nasal phonemes to reduce the Q and thus increase the bandwidth of the F2 resonant filter. The unique manner in which the parameter control functions are implemented in the present system will now be explained.

As previously noted, the preferred embodiment of the present invention is particularly adapted to be implemented in a single integrated circuit utilizing complementary metal oxide semiconductor (CMOS) technology. In view of the desire to design a complete speech synthesizer which is capable of being constructed on a single silicon "chip", a unique approach was taken in the manner in which the parameter control functions are implemented. In particular, rather than utilizing time-weighted duty cycle control signals as in many previous speech systems, the present invention employs a capacitive switching technique to contro the tuning of the vocal tract, as well as the other parameter controlled functions.

Figure 13:
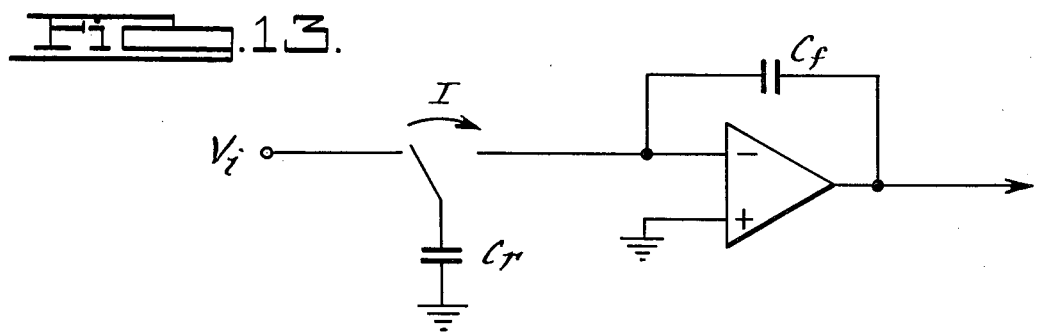
FIG. 13 is a circuit model illustrating the operating principles of the capacitive switching technique employed in the present invention.

With particular reference to FIG. 13, a circuit model illustrating the theory of operation of the capacitive switching technique employed is shown. In FIG. 13, the current (I) into the negative input of the operational amplifier is determined by the charge on the capacitor ($C_r$) and the frequency at which it is switched back and forth ($F_{01}$). Expressed in equation form, therefore:

$$I = F_{01}C_rV_i$$

Since the current (I) is, of course, also equal to ($V_i/R$), the following relationship is presented:

$$R = \frac{1}{F_{01}C_r}$$

Thus, it can be seen that a capacitor that is switched in the manner illustrated in FIG. 13 is essentially equivalent to a resistor. In addition, since the time constant (T) of the circuit is given by the following $$T = RC_f = \left(\frac{1}{F_{01}C_r}\right) C_f = \frac{1}{F_{01}}\left(\frac{C_f}{C_r}\right)$$

the frequency response (F) of the circuit is equal to:

$$F = \frac{F_{01}}{2\pi}\left(\frac{C_r}{C_f}\right)$$

Consequently, it will be appreciated that the time constant and frequency response of an RC circuit simulated by the above capacitive switching technique is dependent not only upon the switching frequency ($F_{01}$), but also, significantly, upon the capacitor ratio of $C_r$ and $C_f$. As a result, in order to achieve a frequency response in the low frequency range of the human voice, it is not necessary to use large capacitors, but simply capacitors having the proper ratio. Thus, for example, with a switching frequency ($F_{01}$) equal to 20 KHz, values for $C_r=1$ pf and $C_f=3.183$ pf will provide a frequency response of 1000 Hz. Thus, as will be appreciated by those skilled in the art, by eliminating the need for large capacitors, the physical size of the silicon chip can be minimized. In addition, since the frequency response is dependent upon the capacitor ratio and not their actual physical size, the tolerance between production batches of the silicon chip can be readily maintained at high accuracy levels.

As can be seen from the circuit diagrams in FIGS. 4, 5, 7 and 8, the above-described capacitive switching technique is utilized in the preferred embodiment to implement the F1, F2, F3, F2Q, FC, $\overline{FC}$, VA, FA and phoneme timing parameter controlled functions. In each instance the control signal parameter is utilized to control the value of the capacitor ratio of the particular circuit involved, and hence the effective resistance value of the circuit, by controlling the on/off state of a plurality of CMOS switches which are individually connected in series with one of a corresponding plurality of binary-weighted, parallel connected capacitors. The switching frequency ($F_{01}$) is set at 20 KHz as established by the $\emptyset 1$ and $\emptyset 2$ clock signals from the timing circuit 38, except in the sub-phoneme clock circuit 42 (FIG. 7) which utilizes the 5 KHz P1 and P1 clock signals from timing circuit 38. The $\emptyset 1$ and $\emptyset 2$ clock signals comprise digital, two-phase clock signals, both having a frequency of 20 KHz. As shown in FIG. 14, the $\emptyset 1$ and $\emptyset 2$ clock signals are opposite in phase and slightly non-overlapping. The purpose of the second non-overlapping clock signal ($\emptyset 2$) is to eliminate parasitic capacitances due to the operational amplifier and the circuit layout.

The operation of the capacitive switching parameter control circuitry is probably best understood by comparing the circuit diagram of the vocal amplitude circuit 62 and the F1 and F2 resonant filters from the vocal tract 60 in FIG. 4 with the resistor equivalence of this circuitry in FIG. 9. As can readily be seen, the VA, F1, F2, F2Q and FC control signal parameters each control the effective resistance value of a variable resistance circuit equivalent by setting the capacitance ratio thereof to one of sixteen discrete values. The sixteen different values are determined, of course, by the state of the four bits in each control signal parameter. This is true of all the parameters except the F2 control parameter which controls the frequency movement of the F2 resonant filter. Although the F2 control signal parameter contains four bits of resolution defining sixteen different target positions as with the other control parameters, a fifth resolution bit is added to the F2 control parameter during the transition process as previously described, to reduce the discrete incremental step movement in the fundamental frequency of the F2 resonant filter as it is dynamically transitioned to its new target position. The fifth resolution bit in the F2 control parameter is provided in the preferred embodiment because the frequency span of the F2 resonant filter is approximately twice that of the F1 resonant filter which also uses four bits of resolution to provide sixteen incremental steps. Consequently, since it is desirable to make the incremental changes small enoughso that transitional step movement is perceived as a gradual change by the human ear, it was deemed necessary to add a fifth resolution bit to the F2 control parameter to reduce the amount of movement in each discrete step.

While the above description constitutes the preferred embodiment of the present invention, it will be appreciated that the invention is susceptible to modification, variation and change without departing from the proper scope or fair meaning of the accompanying claims.

What is claimed is:

1. In a phoneme-based speech synthesizer including parameter storage means for producing, for each phoneme, on a first data bus a plurality of multiplexed digital control parameters defining target values for said control parameters, and a vocal tract model that is controlled in accordance with the current values of said control parameters; the improvement comprising digital transition means for sequentially transitioning said control parameters so that the values of said control parameters are gradually changed from said current values toward said target values, including:
   output means for providing on a second data bus the multiplexed current values of said control parameters;
   demultiplexer means for demultiplexing the signal on said second data bus and producing a corresponding plurality of parallel digital output signals comprising the current values of said plurality of control parameters; and
   arithmetic circuit means for calculating a factor related to a predetermined percentage of the difference between the target value signal on said first data bus and the current value signal on said second data bus, adding said factor to said current value signal at a predetermined rate, and providing the resulting value signal to said output means.

2. The speech synthesizer of claim 1 wherein said predetermined percentage is approximately equal to 12.5%.

3. The speech synthesizer of claim 1 wherein said arithmetic circuit means comprises first circuit means connected to said first data bus for producing a first signal equal to said predetermined percentage of said target value signal, second circuit means connected to said second data bus for producing a second signal equal to said predetermined percentage of said current signal equal to said predetermined percentage of said current value signal, third circuit means for subtracting said second signal from said current value signal and producing a third signal equal to the difference thereof, and fourth circuit means for adding said first signal to said third signal and providing the resultant signal to said output means.

4. In a phoneme-based speech synthesizer including a vocal tract model that is controlled in accordance with a plurality of control parameters generated for each phoneme, the improvement comprising a glottal source generator for digitally generating a glottal pulse signal that is injected into said vocal tract for providing vocal excitation energy to said vocal tract, including:
   parallel-to-serial conversion means having a plurality of parallel inputs each connected to a predetermined d.c. signal level, a serial output for providing said glottal pulse signal, and a plurality of select inputs for selecting which of said parallel inputs is connected to said serial output; and
   counter means having a clock input that is connected to a clock signal having a predetermined frequency for causng said counter means to count at a predetermined rate and a plurality of count outputs connected to said plurality of select inputs from said parallel-to-serial conversion means such that each count of said counter means causes a different one of said parallel inputs to be connected to said serial output.

5. The speech synthesizer of claim 4 wherein said glottal source generator further includes timing means for determining the period of said glottal pulse signal by producing an output signal at the end of each glottal pulse period that is provided to said counter means to reset said counter means.

6. The speech synthesizer of claim 5 wherein said vocal tract includes a first variable resonant filter that is tunable under the control of one of said control parameters and is adapted to produce the first resonant formant in the frequency spectrum of a phoneme, and said timing means is adapted to automatically vary the period of said glottal pulse signal in accordance with the value of said one control parameter.

7. In a phoneme-based speech synthesizer including a vocal tract model that is controlled in accordance with a plurality of control parameters generated for each phoneme which define the steady-state condition of each of said phoneme; the improvement comprising:
   glottal source means for producing a glottal pulse signal that is provided to said vocal tract for supplying vocal excitation energy to said vocal tract, said glottal pulse signal having associated therewith a fundamental frequency with each period thereof comprising an active portion and an inactive portion, said glottal source means including means for producing a glottal sync pulse at the beginning of said active portion; and digital transition means for incrementally changing the values of said control parameters from a first steady-state value toward a second steady-state value including means for synchronizing each incremental change in the values of said control parameters with the production of said glottal sync pulse.

8. The speech synthesizer of claim 7 wherein said glottal source means further includes:

parallel-to-serial conversion means having a plurality of parallel inputs each connected to a predetermined d.c. signal level, a serial output for providing said glottal pulse signal, and a plurality of select inputs for selecting which of said parallel inputs is connected to said serial output; and counter means having a clock input that is connected to a clock signal having a predetermined frequency for causing said counter means to count at a predetermined rate and a plurality of count outputs connected to said plurality of select inputs from said parallel-to-serial conversion means such that each count of said counter means causes a different one of said parallel inputs to be connected to said serial output.

9. The speech synthesizer of claim 8 wherein said glottal source means further includes timing means for determining the period of said glottal pulse signal by producing an output signal at the end of each glottal pulse period that is provided to said counter means to reset said counter means.

10. The speech synthesizer of claim 9 wherein said glottal sync pulse is produced when said counter means is reset.

11. The speech synthesizer of claim 7 wherein said vocal tract model comprises a plurality of switched-capacitor resonant filters digitally tuned by a plurality of parallel-connected, binary-weighted capacitors each connected in series with an electronic switch which is controlled by one of said control parameters.

12. A phoneme-based speech synthesizer comprising means responsive to input data identifying a desired sequence of phonemes for generating a plurality of parallel digital control parameters that electronically define the steady-state condition of each of the phonemes in said desired sequence of phonemes;

glottal source means for producing a glottal pulse signal having associated therewith a fundamental frequency with each period thereof comprising an active portion and an inactive portion, and including means for producing a glottal sync pulse at the beginning of said active portion;

digital transition means for incrementally changing the values of said control parameters from a first steady-state value toward a second steady-state value including means for synchronizing each incremental change in the values of said control parameters with the production of said glottal sync pulse; and a vocal tract model responsive to said glottal pulse signal for substantially producing the frequency spectrum of each of said desired sequence of phonemes, including a plurality of switched-capacitor resonant filters digitally tuned by a plurality of parallel-connected, binary-weighted capacitors each connected in series with an electronic switch controlled by one of said control parameters.

* * * * *